Aug. 2, 1966 W. T. LADUSAW 3,263,403

AIR FILTER CONDITION INDICATOR

Filed Sept. 17, 1964

INVENTOR.
WILLIAM T. LADUSAW
BY *Walter E Rule*
HIS ATTORNEY 3,263,403
AIR FILTER CONDITION INDICATOR
William T. Ladusaw, Jeffersontown, Ky., assignor to General Electric Company, a corporation of New York
Filed Sept. 17, 1964, Ser. No. 397,113
4 Claims. (Cl. 55—274)

The present invention relates to an air filter condition indicator and is more particularly concerned with an air conditioning unit essentially including a multiple speed fan for circulating air through a conditioning unit, a filter for filtering the circulated air and means for indicating the condition of the filter.

Most air conditioning devices such as refrigeration cooling apparatus, heat pumps and the like include a filter for filtering the air stream being conditioned. Thus in room or window mounted air conditioners, a filter is usually disposed on the upstream side of the evaporator for removing dust and lint particles from the air prior to contact thereof with the evaporator.

It is well known that, when the filter in an air conditioning unit becomes dirty, there is a significant reduction in the amount of air flowing therethrough and also a reduction in the operating efficiency of the unit. Accordingly, it is desirable to provide some means for indicating a dirty filter condition. The usual filter condition indicator used or proposed for this purpose comprises a differential pressure gauge responsive to a change in the pressure differential across the filter for indicating when the filter has become clogged to the point where it should be cleaned or replaced. The accuracy of such indicators is influenced by the fan speed or more specifically by the velocity of the air stream being filtered. In other words, an indicator adapted to indicate a dirty condition of a filter at one fan speed will not accurately indicate the same filter condition at a different fan speed.

It is a primary object of the present invention to provide an air conditioning unit including a multiple speed fan for circulating a stream of air through the unit at different velocities, a filter for filtering the circulated air stream and a filter condition indicator adapted to indicate the condition of the filter regardless of fan speed.

A further object of the invention is to provide an air conditioning unit including a multiple speed fan operable at either a low speed or a high speed, a filter positioned upstream from the fan for filtering the air passing therethrough, control means for selectively operating the fan at either a low or a high speed and filter condition indicating means associated with the fan control means for indicating the filter condition at either speed.

Further objects and advantages of the present invention will become apparent as the following description proceeds and the features of novelty which characterize the invention will be pointed out with particularity in the claims annexed to and forming a part of this specification.

In accordance with one aspect of the present invention, there is provided an air conditioning unit comprising a multiple speed fan operable at either a low speed or a high speed for moving a stream of air through the unit at either a low velocity or a high velocity and fan control means movable to a first position or setting to operate the fan at a low speed and to a second position or setting to operate the fan at a high speed and a filter positioned within the unit for filtering the stream of air circulated by the fan. A filter condition indicating means indicating an increased pressure drop across the filter when the filter becomes dirty is provided to indicate to the user of the equipment when the filter requires cleaning or changing. As a filter offers a greater resistance to the flow of air at high air velocities than at low air velocities, the filter indicating means includes an indicator movable, when the filter is dirty, to a first position at low fan speed and a second position at high fan speed and the fan control means includes means for indicating respectively the first and second positions of the indicator at the low and high settings of the fan control means whereby a dirty filter condition will be accurately indicated at either fan speed.

For a better understanding of the invention reference may be had to the accompanying drawings in which.

Figure 1:
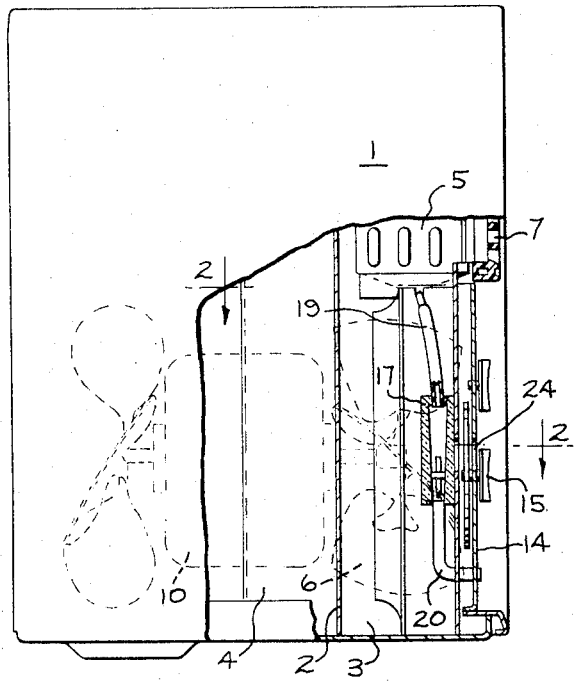
FIGURE 1 is a schematic elevational view, partly in section of an air conditioning unit including the filter condition indicating means of the present invention.

Referring to FIGURE 1 of the drawing, there is shown one embodiment of the present invention in the form of an air conditioning unit of the type generally known as a window mounted or room air conditioner and which is adapted to be mounted in a window or other opening in a wall of an enclosure. The unit includes a casing 1 which is divided by means of a barrier 2 into an indoor compartment 3 and an outdoor compartment 4. A refrigeration system housed within the casing 1 includes an evaporator 5 contained within the indoor compartment 3. Room air to be conditioned is drawn into the indoor section 3 by means of a fan 6 and this air after passing over the evaporator 5 is discharged back into the room through the grille 7. Room air entering the indoor compartment 3 passes through a filter 8 so that dust and lint particles are removed from the air stream before the stream comes into heat exchange relationship with the evaporator 5.

Figure 4:
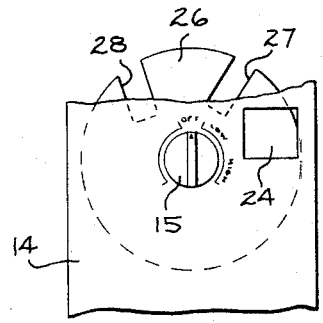
FIGURE 4 is a detailed view illustrating a portion of the fan control means employed in the practice of the present invention.
Figure 3:
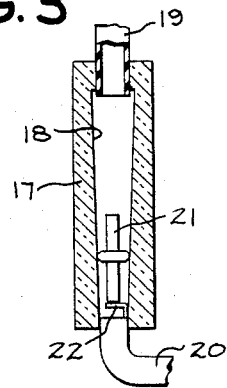
FIGURE 3 is an enlarged sectional view indicating detailed construction of the indicating means forming part of the present invention.
Figure 2:
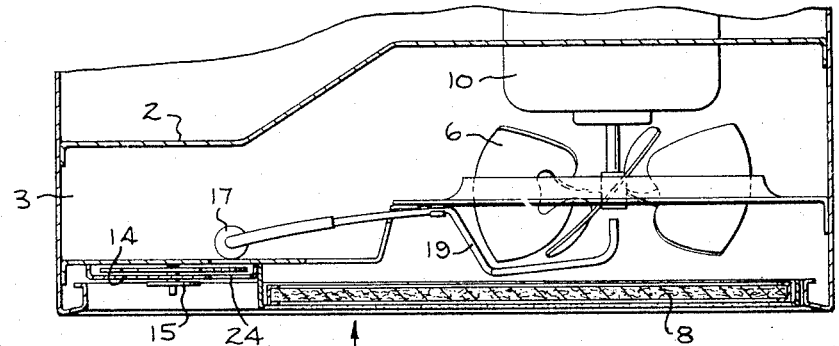
FIGURE 2 is a sectional view taken generally along the line 2—2 of FIGURE 1.

The fan 6 is driven by a multiple speed motor 10 so that the fan can operate at either a low speed or a high speed to provide varying comfort conditions with the area served by the unit. The controls for controlling the operation of the fan and the refrigeration system are generally mounted on a control panel 14 and these controls include a fan control switch 15 which as is shown in FIGURE 4 includes as off setting, a low fan speed setting and a high fan speed setting.

As is well known, the pressure drop across the filter 8 is dependent upon the resistance to air flow presented by the filter and this resistance increases so that the pressure drop increases when the filter becomes clogged or partially clogged with dirt or lint. For the purpose of indicating an increase in this pressure drop as a result of clogging of the filter so that the user of the unit will be informed that the filter should be cleaned or changed, there is provided a differential pressure gauge connected in parallel with the filter 8. This condition indicating means includes a vertically extending transparent tube 17 of glass or clear plastic having an upwardly tapered or flared bore 18 connected at its upper end by means of a conduit 19 to a portion of the air flow path downstream from the filter 8 and its lower end by means of a conduit 20 to a point outside the casing 1 or in other words to a pressure area upstream from the filter 8. A float 21 postiioned within the tapered bore 18 is adapted to move vertically a distance proportional to the velocity of the flow of air upwardly through the bore 18 or in other words a distance proportional to the pressure differential across the filter 8. The upward tapering or flaring of the bore 18 adapts the indicating means for operation at any of a plurality of fan speeds due to the fact that as the air velocity or flow increases more air will bypass the indicator 21 thereby limiting the rate at which the float rises with increased air flow. In other words the height to which the float 21 will rise depends upon the rate of air flow through the tube 17 which in turn is dependent both upon the speed of the fan 6 and the pressure drop across the filter 8. At a low fan speed and the minimum filter pressure drop provided by a clean filter, the float will rise to a first elevation. As the filter becomes clogged with dirt and lint, the resultant increased pressure drop will increase the air flow through the tube 17 and the elevated position of the float 21 will gradually increase. At high fan speed and clean filter conditions, the float 21, due to the greater air velocity through the bore 18 will rise to a more elevated position than at low fan speed under similar filter conditions and as the filter becomes clogged with dirt the high fan speed position of the indicator 21 will become more elevated. The upwardly flared or tapered shape of the bore 18 is so designed as to restrict the travel of the float 18 within an observable range as hereinafter described. When the fan is not operating the float 21 is supported on a stop 22 at a sufficient elevation so that it will not become wedged in the bottom portion of the tapered bore 18.

As the float or indicator 21 will move to a first position at a low fan speed and a second higher position at high fan speed for the same filter condition, for simplicity of operation and in order that the user of the air conditioning unit will be alerted to the fact that the filter should be cleaned or replaced whether the unit is being operated on the low fan speed or the high fan speed, means are provided in accordance with the present invention for indicating a dirty filter at either fan speed. To this end there is provided a novel combination of the fan control means 15 and the indicator tube 17 whereby the same filter condition will be indicated through a window 24 provided in the panel 14 regardless of the fan speed setting.

Figure 5:
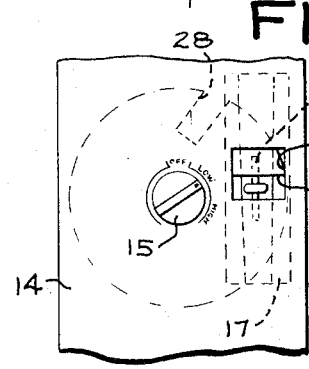
FIGURE 5 is a view similar to FIGURE 4 illustrating one operating condition of the control and indicating means of the present invention.

More specifically, the indicator tube 17 is mounted rearwardly of the panel 14 adjacent the fan control means 15 at an elevation such that regardless of the fan speed setting, the float 21 will be observable through the window 24 when the indicator is at an elevation indicating a dirty filter condition. A disc 26 operatively connected to the fan control means 15, as for example mounted on the control shaft, is provided with two or more slots 27 and 28 one of which registers with the window 24 at each fan speed setting. For example, as is shown more clearly in FIGURE 5, slot 27 registers with the window 24 when the fan is set for low speed operation and the slot 27 is so positioned as to opposite or in line with that portion of the tube 17 in which the indicator 21 will float under dirty filter conditions at a low fan speed. In other words when the float 21 is observable through the slot 27 at the low fan speed setting, the filter has become sufficiently clogged to require cleaning or replacement.

The slot 28 which registers with the window 24 at high fan speed setting is designed to register with a higher portion of the window or in other words the portion through which the float 21 is observable when the fan is operating on high speed and the filter is sufficiently clogged as to require cleaning or replacement. More specifically, in the illustrated embodiment of the invention, the low fan speed setting slot 27 is designed to register with the lower portion of the window 24 while the high speed fan slot 28 is designed to register with the upper portion of the window, the window 24 being of a size such that the indicator 21 is opposite the window under dirty filter conditions at either high or low fan speeds.

It will be obvious that for additional fan speeds, additional slots corresponding to the slots 27 and 28 may be provided in the disc 26 and it will be obvious also that means other than slots may be employed in combination with or operable by the fan control means for indicating to the user the point or points at which the indicator 21 positions itself at various fan speed operations and under dirty filter conditions. However, for maximum simplicity of use, the means for indicating the various positions of the float requiring cleaning or replacement of the filter at various fan speeds should render the float or the indicator 21 observable only when it is in the position indicating a dirty filter at the particular fan speed setting. If desired, the upper portion of the float may be of one color such as green and the center and lower portions of another color such as red and the bore taper and float weight proportioned so that when the fan is turned on at either speed, the observance of the green upper portion indicates a clean filter while the observance of the red portion indicates plugging of the filter.

While there has been shown and described a particular embodiment of the invention, it will be obvious to those skilled in the art that various changes and modifications can be made therein without departing from the invention and it is therefore intended in the appended claims to cover all such changes and modifications as fall within the true spirit and scope of the invention.

What I claim as new and desire to secure by Letters Patent of the United States is:

1. An air conditioning unit comprising:
   a multiple-speed fan operable at either a low speed or a high speed for moving a stream of air through said unit at either a low velocity or a high velocity,
   fan control means movable to a first setting to operate said fan at a low speed and to a second setting to operate said fan at a high speed,
   a filter positioned in said unit for filtering said stream of air, said filter offering a greater resistance to the flow of air therethrough at a high fan speed than at a low fan speed,
   filter condition indicating means responsive to the pressure drop across said filter for indicating when said filter is dirty,
   said indicating means including an indicator movable, when said filter is dirty, to a first position at low fan speed and to a second position at high fan speed,
   and means for indicating said first position when said fan control means is at its first setting and said second position when said fan control means is at its second setting.

2. An air conditioning unit comprising:
   a two-speed fan operable at either a low speed or a high speed for moving a stream of air through said unit at either a low velocity or a high velocity,
   fan control means movable to a first setting to operate said fan at a low speed and to a second setting to operate said fan at a high speed,
   a filter positioned in said unit for filtering said stream of air, said filter offering a greater resistance to the flow of air therethrough at a high fan speed than at a low fan speed,
   filter condition indicating means responsive to the pressure drop across said filter for indicating when said filter is dirty,
   said indicating means including an indicator movable, when said filter is dirty, to a first position at low fan speed and to a second position at high fan speed,
   and means operated by said fan control means for indicating said first position when said fan control means is at its first setting and said second position when said fan control means is at its second setting.

3. An air conditioning unit comprising:
   a two-speed fan operable at either a low speed or a high speed for moving a stream of air through said unit at either a low velocity or a high velocity,
   a filter positioned in said unit upstream from said fan for filtering said stream of air, said filter offering a greater resistance to the flow of air therethrough at a high fan speed than at a low fan speed, a control panel having a window therein, fan control means movable to a first setting to operate said fan at a low speed and to a second setting to operate said fan at a high speed, filter condition indicating means responsive to the pressure drop across said filter for indicating when said filter is dirty, said indicating means comprising a vertical transparent tube having an upwardly flared bore positioned behind said window, a float in said tube adapted to assume a vertical position therein proportional to the flow of air through said passage, means connecting said tube in parallel air flow relationship with said filter whereby said float, when said filter is dirty, moves to a first elevation opposite said window at low fan speed and a second elevation opposite said window at high fan speed, a disc positioned between said tube and said window and operatively connected to said fan control means, said disc including a first slot registering with one portion of said window opposite said first elevation of said float when said control means is at its first setting and a second slot registering with a second portion of said window opposite said second elevation of said float when said control means is at its second setting whereby a dirty condition of said filter will be indicated at either of said fan speeds.

4. An air conditioning unit comprising:

a two-speed fan operable at either a low speed or a high speed for moving a stream of air through said unit at either a low velocity or a high velocity, a filter positioned in said unit upstream from said fan for filtering said stream of air, said filter offering a greater resistance to the flow of air therethrough at a high fan speed than at a low fan speed, a control panel having a window therein, fan control means mounted on said panel adjacent said window movable to a first setting to operate said fan at a low speed and to a second setting to operate said fan at a high speed, filter condition indicating means responsive to the pressure drop across said filter for indicating when said filter is dirty, said indicating means comprising a vertical transparent tube having an upwardly flared bore and positioned behind said window, a float in said tube adapted to assume a vertical position therein proportional to the flow of air through said passage, means connecting said tube in parallel air flow relationship with said filter whereby said float, when said filter is dirty, moves to a first elevation observable through said window at low fan speed and a second elevation observable through said window at high fan speed, a disc positioned between said tube and said window and operatively connetced to said fan control means, said disc including a first slot registering with said window opposite said first elevation of said float when said control means is at its first setting and a second slot registering with said window opposite said second elevation of said float when said control means is at its second setting whereby a dirty condition of said filter will be indicated at either of said fan speeds.

References Cited by the Examiner

UNITED STATES PATENTS

| | | | |
|---|---|---|---|
| 2,700,362 | 1/1955 | Calling | 55—274 X |
| 2,927,659 | 3/1960 | Pabst et al. | 55—274 X |
| 3,071,914 | 1/1963 | Gesmar | 55—274 |
| 3,201,772 | 8/1965 | Ladusaw | 55—274 |

ROBERT F. BURNETT, *Primary Examiner.*